United States Patent [19]
Fleming

[11] Patent Number: 6,023,772
[45] Date of Patent: Feb. 8, 2000

[54] FAULT-TOLERANT PROCESSING METHOD

[75] Inventor: Roger Alan Fleming, Bristol, United Kingdom

[73] Assignee: Hewlett-Packard Company, Palo Alto, Calif.

[21] Appl. No.: 08/913,933

[22] PCT Filed: Jan. 24, 1997

[86] PCT No.: PCT/GB97/00222

§ 371 Date: Sep. 25, 1997

§ 102(e) Date: Sep. 25, 1997

[87] PCT Pub. No.: WO97/27541

PCT Pub. Date: Jul. 31, 1997

[30] Foreign Application Priority Data

Jan. 26, 1996 [GB] United Kingdom .................. 9601585

[51] Int. Cl.$^7$ ........................................ G06F 11/00
[52] U.S. Cl. .............................. 714/13; 714/11; 714/15; 709/300; 709/400
[58] Field of Search ................... 714/13, 11, 12, 714/15, 16, 20, 38, 39, 41, 2; 709/300, 400

[56] References Cited

U.S. PATENT DOCUMENTS

| | | | |
|---|---|---|---|
| 4,590,554 | 5/1986 | Glazer et al. | 714/13 |
| 4,665,520 | 5/1987 | Strom et al. | 714/15 |
| 4,937,741 | 6/1990 | Harper et al. | 709/400 |
| 5,157,663 | 10/1992 | Major et al. | 714/10 |
| 5,235,700 | 8/1993 | Alaiwan et al. | 709/300 |
| 5,325,528 | 6/1994 | Klein | 709/300 |
| 5,455,932 | 10/1995 | Major et al. | 711/162 |
| 5,530,802 | 6/1996 | Fuchs et al. | 710/102 |
| 5,555,371 | 9/1996 | Duyanovich et al. | 714/13 |
| 5,590,277 | 12/1996 | Fuchs et al. | 714/38 |
| 5,835,953 | 11/1998 | Ohran | 711/162 |

OTHER PUBLICATIONS

"A Principle for resilent sharing of distributed resources" by Peter A. Alsberg and John D. Day, Proceedings 2nd International Conference on Software Engineering, San Francisco, CA, Oct. 13–15, 1976, pp. 562–570.
Fault Tolerance Under UNIX pp. 1–24.
Using Passive Replicates in Delta–4 To Provide Dependable Disrtibuted Computing pp. 184–190.

*Primary Examiner*—Dieu-Minh T. Le

[57] ABSTRACT

A recovery unit in a software fault-tolerant system has primary and secondary processing units (I, II) running replicate application processes (24). Input messages sent to the recovery unit are received at the primary unit (I) and in due course processed by the primary process (24) to produce application messages; however, these application messages produced by the primary process (24) are not normally output from the primary unit I as the recovery-unit output messages. Instead, these application messages are logged from the primary unit (I) to the secondary unit (II) together with state update information. The secondary process (24) run by secondary unit (II) uses this update information to updates its own state so as to track the state of the primary process. The secondary unit (II) outputs the application messages logged to it from the primary unit (I) as the recovery-unit output messages. Should the primary unit (I) fail, the secondary unit (II) takes over the role of the primary. Furthermore, in the absence of an operative secondary unit (II) (due either to its failure or to its promotion to the primary unit), the primary unit becomes responsible for outputting its own application messages as the recovery-unit output messages. Configurations with multiple secondaries are also possible.

26 Claims, 5 Drawing Sheets

FAULT-TOLERANT PROCESSING METHOD

FIELD OF THE INVENTION

The present invention relates to a fault-tolerant processing method for receiving and processing input messages to produce output messages. More particularly, the present invention relates to a method of operating a software fault tolerant recovery unit where the processing of input messages is done by replicate primary and secondary application processes.

It should be noted that the term "process" is used herein in a general sense of processing functionality provided by code executing on a processor however this code is organised (that is, whether the code is an instance of only part of a program, or of a whole program, or is spread across multiple programs). Furthermore, reference to a process as being an "application" process is intended to be understood broadly in the sense of a process providing some desired functionality for which purpose input messages are sent to the process.

BACKGROUND OF THE INVENTION

Software-based fault-tolerant systems may be considered as organised into one or more recovery units each of which constitutes a unit of failure and recovery. A recovery unit may be considered as made up of a live process, an arrangement for logging recovery information relevant to that live process, and recovery means, which in the event of failure of the live process, causes a replacement process to take over.

Of course, if failure of the live process due to failure of the processor running it is to be covered, then both the storage of recovery information and the recovery means itself must be separate from the processor running the live process.

Where a system comprises multiple recovery units, these will typically overlap in terms of processor utilisation; for example, the processor targetted to run the replacement process for a first recovery unit, may also be the processor running the live process of a second recovery unit. In fact, there may also be common resource utilisation by the recovery units in respect of their logging and recovery means.

An illustrative prior-art fault-tolerant computer system is shown in FIG. 1 of the accompanying drawings. This system comprises three processors I, II, III and a disc unit 10 all interconnected by a LAN 11. The system is organised, as two recovery units A and B each of which has an associated live process A/L, B/L. Live process A/L runs on processor I and live process B/L runs on processor II. Recovery unit A is arranged such that upon failure of its live process A/L, a replacement process A/R will be take over on processor II; similarly, recovery unit B is arranged such that should live process B/L fail, a replacement process B/R takes over on processor III.

A live process will progress through a succession of internal states depending on its deterministic behaviour and on non-deterministic events such as external inputs (including messages received from other live processes, where present) and non-deterministic internal events.

When a replacement process takes over from a failed live process, the replacement process must be placed in a state that the failed process achieved (though not necessarily its most current pre-failure state). To do this, it is necessary to know state information on the live process at at least one point prior to failure; furthermore, if information is also known on the non-deterministic events experienced by the failed process, it is possible to run the replacement process forward from the state known about for the failed process, to some later state achieved by the latter process.

Where speed of recovery is not critical, an approach may be used where state information on the live process (process A/L in FIG. 1) is periodically checkpointed by the logging means of the recovery unit from the volatile memory of the processor running the process to stable store (disc unit 10). Upon failure of the live process A/L, the recovery means of the recovery unit can bring tip a replacement process A/R in a state corresponding to the last-checkpointed state of the failed live process. Of course, unless check-pointing is effected at every state change, the state of the replacement process A/R will generally be behind the actual state achieved by the live process prior to failure. This can be alleviated by having the logging means of the recovery unit securely store appropriate information on all non-deterministic events experienced by the live process between its checkpoints and then arranging for the recovery means to replay these events to the replacement process to bring it more up-to-date.

Where speed of recovery is critical, it is generally preferred to run at least one replicate process (process B/R in FIG. 1) that shadows the processing of the live process B/L and receives the same non-deterministic events as the latter; in this context, the live and replicate processes are also known as the primary and secondary processes respectively. The replicate process B/R effectively acts as a store of state information on the live process B/L. The live process and its replicate may be tightly coupled so that they are always in step, or loosely coupled with the replicate generally lagging behind the live process. Upon failure of the live process B/L the recovery means causes the replicate process to take over as the replacement process B/R; where the coupling between the live process and its duplicate is only loose, if appropriate information on the non-deterministic events experienced by the live process has been stored, the replicate may be brought more up-to-date by using this information.

The present invention is concerned with software fault-tolerant systems that employ logging to a replicate process.

It will be apparent that the overhead involved in logging recovery information is considerably greater in arrangements where the replacement process is brought up to the state of the live process at failure. In fact, it is not necessary to put the replacement process in the same state as the live process at failure; instead, the need is to put the replacement process into the last externally visible state, meaning the last state in which the recovery unit produced output either to externally of she fault-tolerant system or to other recovery units in the system. Put in other words, the requirement is that there be no lost states as perceived from externally of the recovery unit. Because it may not be possible to control events external to the system, before any system-external output is made, the logging means of the recovery unit is generally caused either to checkpoint the live-process state information and securely store non-deterministic event information, or in the case of a loosely coupled replicate process to ensure that the latter has received the same non-deterministic event information as the live process. This procedure is known as 'output commit' and can constitute a substantial processing overhead.

The same procedure can be used in relation to output made to other recovery units in the fault-tolerant system though if this is not possible (for example, because the overhead involved in providing this ability is considered too great), then the recovery means will need to "roll back" the non-failed live processes to states consistent with the one into which the replacement process can be put. Rollback is, however, a complex procedure and generally not attractive.

It is an object of the present invention to provide a simplified arrangement for ensuring that there are no lost states when a replicate process is promoted to take over from a failed live process.

SUMMARY OF THE INVENTION

According to the present invention, there is provided a method of operating a fault-tolerant recovery unit for receiving and processing input messages to produce output messages, the method comprising the steps of:

(a) providing at least two processing entities running respective replicate application processes capable of processing input messages to progress through a succession of states and produce application messages, one processing entity serving as a primary processing entity and each other processing entity serving as a secondary processing entity with one secondary processing entity acting as a sender processing entity; p1 (b) receiving input messages at the primary processing entity and causing the replicate application process run by the latter, herein the primary process, to process these input messages to produce application messages;

(c) logging to each secondary processing entity the application messages produced by the primary process together with update information for enabling the replicate application process run by each secondary processing entity, herein a secondary process, to update its state to track the state of the primary process;

(d) causing each secondary process to use the update information logged to the secondary processing entity running the secondary process, in order to track the state of the primary process; and (e) outputting from the sender processing entity as the recovery-unit recovery messages, the application messages logged to the sender entity from the primary processing entity in step (c),the application messages so output being restricted to those produced by the primary process during processing for which update information has been received by the sender entity;

the method comprising the further steps of:

(f) upon failure of the primary processing entity, causing a secondary processing entity to take over the role of the primary processing entity, and (g) upon failure of the sender processing entity or upon the sender processing entity taking over the role of the primary processing entity in step (f), causing another of the secondary processing entities, where present, to become the sender processing entity, and otherwise, causing the primary processing entity to output the application messages produced thereby as the recovery-unit output messages, this step (g) being effected without loss of recovery-unit output messages.

Because the sender processing entity only outputs the recovery-unit output messages once the update information on the processing that produces those messages has been received by the sender entity, there will not be externally visible lost states should either the primary or any of the secondary processing entities fail.

In one embodiment, each application message output in step (e) is only output after the state of the secondary process of the sender processing entity has been updated to take account of the processing effected by the primary process in producing that application message. In another embodiment, the application messages are output without waiting for the state of the secondary process of the sender entity to be updated.

Preferably, the update information comprises the changes in state experienced by the primary process in processing each input message, each secondary process directly using this state-change information to update its own state in step (d). In an alternative, nonpreferred, arrangement, the update information comprises the input messages themselves together with any non-deterministic choices made by the primary process in processing these input message; each secondary process then updates its state in step (d) by processing the input messages but instead of itself making any non-deterministic choices required by this processing, it uses the choices logged to it as part of said update information.

Generally, though not essentially, the primary and secondary processes will be arranged to execute on separate processors. The functionality providing the fault-tolerant characteristics of the method may be implemented as part of the primary and secondary processes themselves (for example, incorporated as linked libraries) or may be provided as a separate software layer providing services to the primary and secondary processes. As regards the number of secondary processing entities, multiple secondaries can be provided though for simplicity in many cases a single secondary processing entity will be adequate and reference to "each" secondary entity or process is to be understood as encompassing the singular case.

Where multiple secondary processes are provided, these can be configured in different arrangements. In a first, pass-along, arrangement the primary processing entity carries out logging to one of the secondaries which in turn effects logging to another of the secondaries and so on as required, the sender processing entity being the final entity in this logging chain. In a second, one-to-many arrangement, the primary processing entity carries out logging to all the secondary processing entities directly itself. For both arrangements, resend queues of logged items are maintained by at least one entity in order to facilitate failure recovery.

Following failure of the primary processing entity it will generally be necessary to arrange for input-message sources to resend at least their latest messages since the primary processing entity at the time of its failure may not have dealt with all received input messages. However, the responsibility for triggering this resending will frequently belong to a fault-tolerance manager which upon detecting a failure condition in the recovery unit, requests all input-message sources to retransmit unacknowledged messages for the recovery unit concerned.

Similarly, upon failure of the sender processing entity, it will generally be necessary for the processing entity taking over this role to resend any unacknowledged output messages since the entity taking over the sender role may be further advanced than the failed sender entity so that output messages could be lost if the new sender were simply to send only its newly generated messages. To enable the new sender processing entity to resend output messages, this entity is caused to normally maintain a queueing arrangement of the application messages generated by the primary process, this queueing arrangement serving as the source of output messages for resending should the sender entity fail. Solutions other than queuing and resending output messages are also possible; thus where there are multiple secondaries, the secondary designated to take over from the sender entity should the latter fail, can be arranged to lag behind the sender entity.

In fact, the queuing of application messages is the preferred solution to avoiding the possibility of output message loss and, indeed, each processing entity advantageously maintains a resend queueing arrangement holding the application messages generated by the primary process. One reason for having more than one processing entity maintain such a queue is that if only one processing entity were involved, then should this entity fail, reconstructing the message queues would at best be difficult and inconvenient.

Another reason to maintain a resend queueing arrangement holding application messages is to enable the retransmission of messages to another recovery unit that has suffered a failure and requires recent messages to be resent.

In order to permit the resend queueing arrangement of a processing entity to be kept to managable proportions, the method of the invention preferably comprises the further step of receiving input acknowledgements acknowledging the receipt of the output messages sent by the recovery unit, and removing from the resend queueing arrangement those output messages the receipt of which has been acknowledged. The method of the invention will also preferably include the further step of outputting from the sender processing entity an acknowledgement of each said input message received by the primary processing entity, this acknowledgement being output following receipt by the sender processing entity of the update information that takes account of the processing effected by the primary process in processing the input message concerned.

Following failure of a processing entity, a new secondary processing entity running a new secondary process, will generally be brought up and state information transferred to it from a non-failed processing entity. Where each processing entity has an associated resend queueing arrangement, then it would be possible to transfer the contents of the queueing arrangement of the non-failed processing entity to the resend queueing arrangement of the new entity; however, this involves a substantial overhead. Preferably therefore, such a transfer is not affected. Instead, should the new secondary processing entity become the sender entity and be requested to resend messages to a particular recovery unit undergoing failover, then the non-failed processing entity that originally transferred its state to the new processing entity, is caused to send, either directly or via a secondary processing entity, to said particular further recovery unit messages in its resend queueing arrangement that are addressed to that particular further recovery unit and are associated with states of said non-failed processing entity entered prior to it transferring its state to the new processing entity.

In one embodiment a recovery unit recovering from failure of one of its processing entities sends output messages from two different sources, thus any receiving recovery unit must be capable of handling this and also of coping with the possibility of messages being received out of order. Advantageously, therefore, the input messages contain information as to their source and, at least implicitly, their sequencing, and step (b) further involves temporarily storing input messages received out of sequence from a said source whilst awaiting receipt of missing earlier-in-sequence messages, and submitting the input messages received from the source for processing by the primary process in their correct sequencing.

In an alternative embodiment a recovery unit recovering from failure of one of its processing entities sends output messages from only one of its processing entities. Preferably, following failure of a secondary processing entity, a new secondary processing entity running a new said secondary process is brought up and responsibility for sending output messages is transferred from the primary processing entity to said new secondary processing entity. The new secondary processing entity then requests from the primary processing entity only those ouput messages required by other recovery units. This involves a far lower overhead than would checkpointing all of the stored messages at the primary processing entity since only those messages which are really required by remote recovery units are copied from the primary processing entity to the secondary processing entity.

BRIEF DESCRIPTION OF THE DRAWINGS

A fault-tolerant method embodying the invention will now be described, by way of non-limiting example, with reference to the accompanying diagrammatic drawings, in which.

BEST MODE OF CARRYING OUT THE INVENTION

Figure 1:
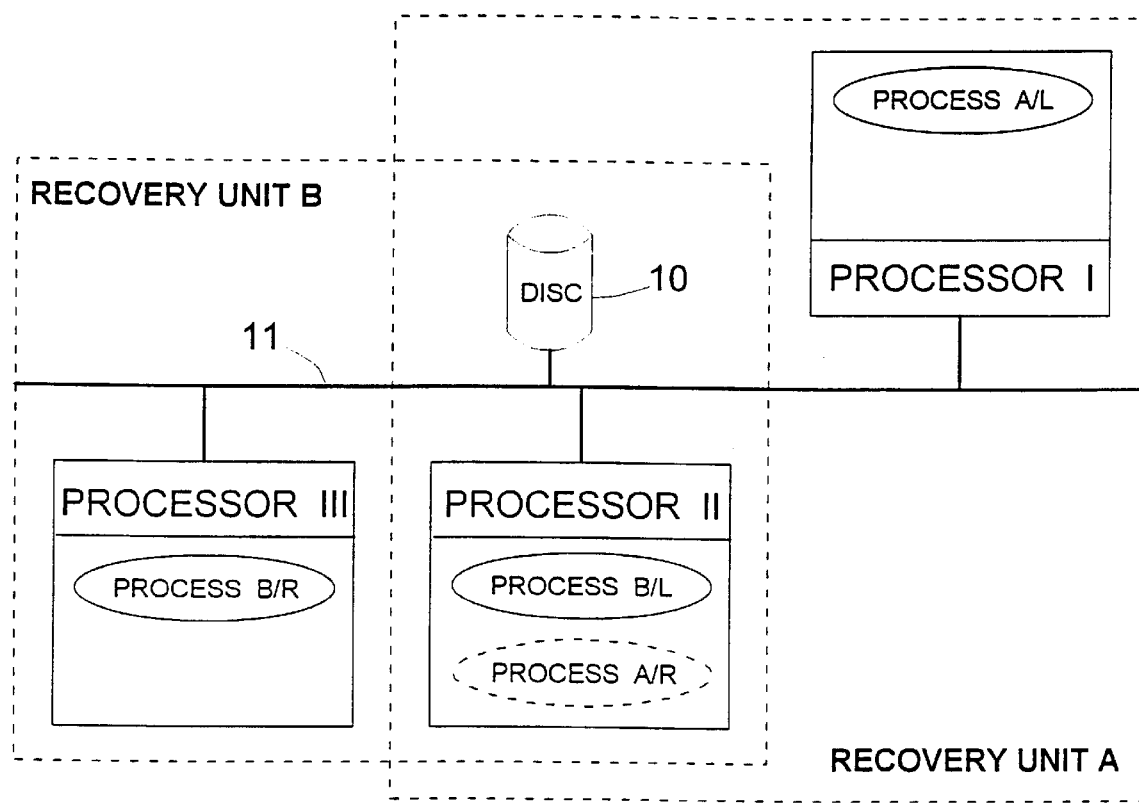
FIG. 1 is a block diagram of a prior art fault-tolerant system.
Figure 2:
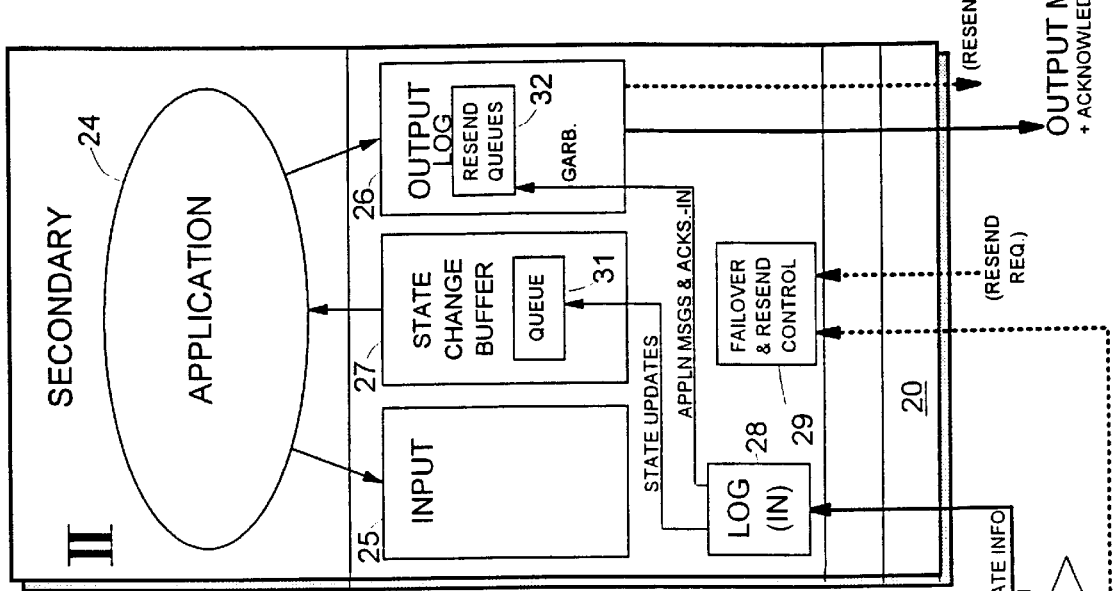
FIG. 2 is a block diagram of a fault-tolerant recovery unit implementing the present invention.
Figure 2:
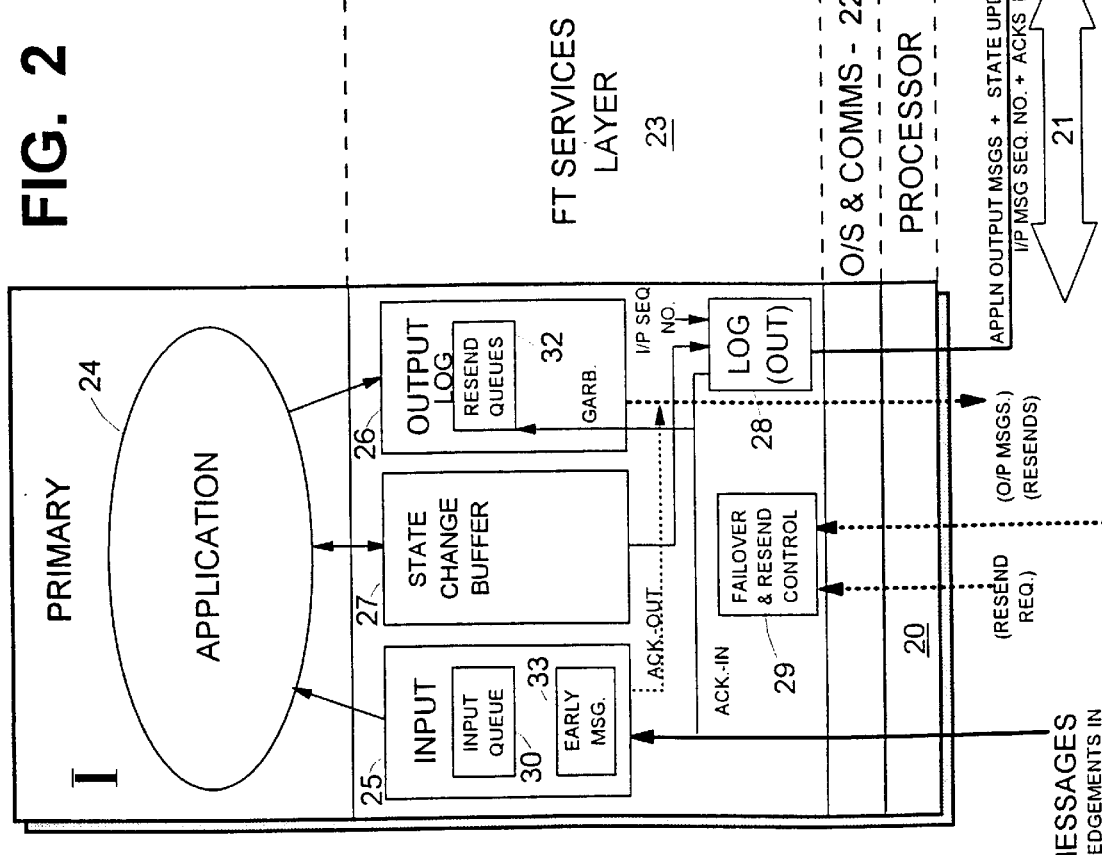

FIG. 2 illustrates a recovery unit of a fault-tolerant system embodying the present invention. The recovery unit comprises communicating first and second processing entities which in the present case are constituted as separate primary and secondary processing units I and II each comprising a processor 20 running software, and an appropriate communications arrangement 21 (for example, a LAN) enabling the units I and II to talk to each other; the communications arrangement 21 also enables the units I and II to talk to other system elements, such as other recovery units.

For clarity of explanation, the software run by each processing unit I, II is shown as an operating system/communications layer 22 providing a basic operational environments a fault-tolerant services layer 23 providing services for fault-tolerant operation of application processes, and the application processes 24 themselves, conceptually running on top of the layers 22 and 23.

In the present example, only one application process 24 is illustrated, this process serving to provide some specific processing functionality involving the processing of input messages to produce output messages. This processing may involve the making of non-deterministic choices.

The processes 24 run by the units I and II are replicate application processes with the process running on the primary processing unit I acting as a primary process and the process running on the secondary processing unit II acting as a secondary process. Because the processes are replicates, when starting from the same initial state, they will progress through the same succession of states and produce the same output on experiencing the same succession of input messages and non-deterministic choices. In fact, in the present embodiment, only the primary process actually processes the input messages, the secondary process being updated with state change information from the primary process rather than processing the input messages itself.

In practise, the fault-tolerant services provided by the layer 23 in FIG. 2 and to be described hereinafter, can be provided either by a separate software layer, as illustrated, to discrete replicate application processes (where the term 'process' is here used in the specific sense of an executing instance of a program) or as an integral part of each replicate process (for example by inclusion as linked libraries). The illustration in FIG. 2 of the provision of the fault-tolerant services by a separate software layer, has simply been chosen for clarity of explanation and the person skilled in the art will recognise that the following description is generally equally applicable to either implementation. It will also be understood that the term "process", as applied to the processes 24 is intended to be read in a general sense of executing code providing particular functionality rather than in any more formal way that could be construed as excluding the intended possibility of the fault-tolerant services code being part of the same executing program instance as the application process code.

The FT services layer 23 provides a number of services to the corresponding application process 24, though a different mix of these services are used depending on the primary/secondary nature of the processing unit concerned. Because all FT services are available in each processing unit I, II it is possible for the role of the corresponding process 24 to be changed.

The FT services layer 23, provides functionality that, for clarity, is represented in FIG. 2 by five main functional blocks namely an input block 25, an output block 26, a state-change buffer block 27, a log block 28, and a failover and resend control block 29. The functions of these blocks 25 to 29 depends on whether the supported process 24 is serving as the primary or secondary process as will become clear from the following description of the operation of the FIG. 2 recovery unit. In this description, the epithet "primary" or "secondary" applied to any one of the element 23 to 29 indicates to which of the primary and secondary units I, II the element belongs.

Failfree Operation—"Late Output" Embodiment

Figure 3:
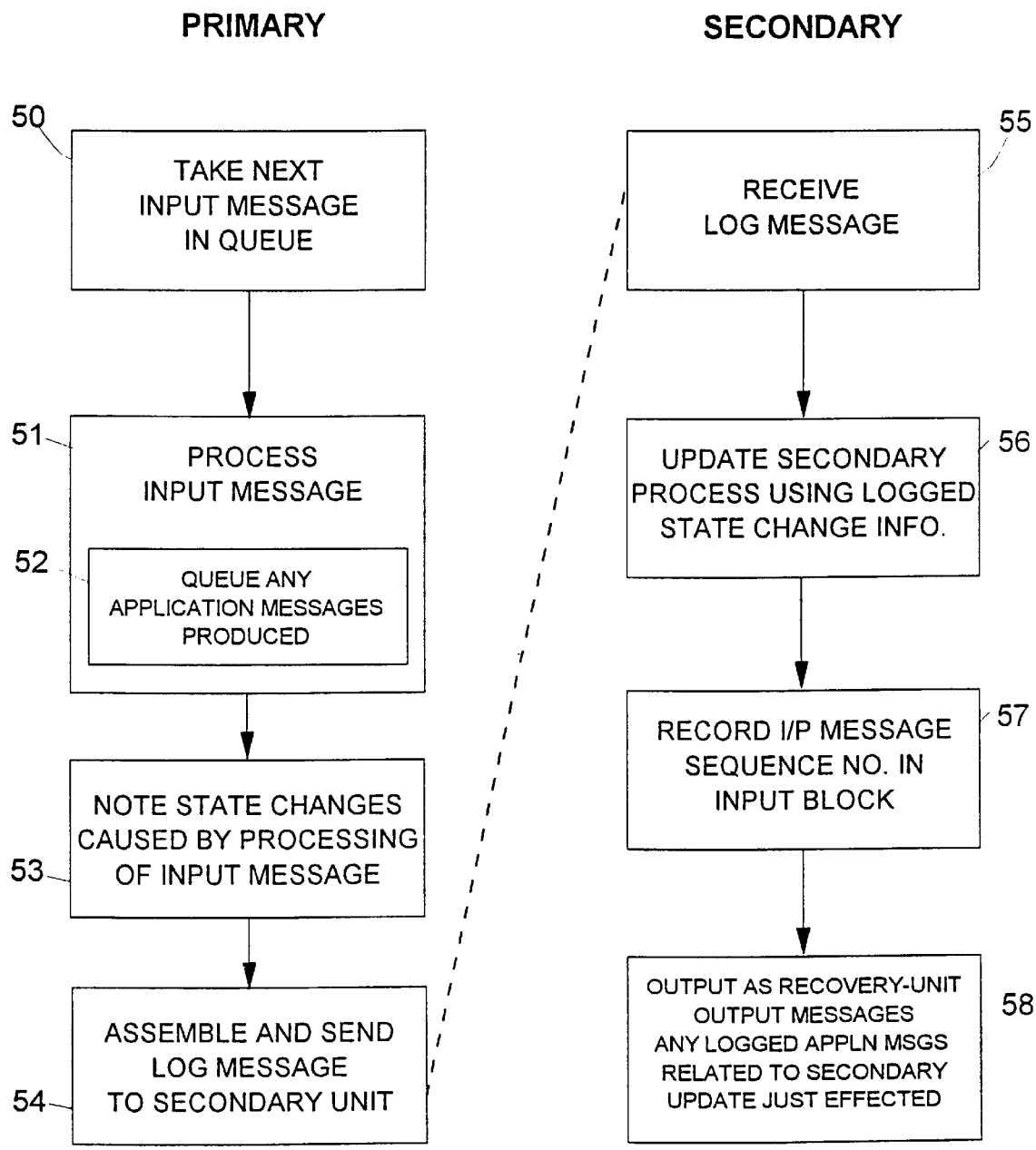
FIG. 3 is a diagram illustrating the main stages occurring during normal operation of the FIG. 2 recovery unit.

The failfree operation of a "late output" embodiment of the FIG. 2 recovery unit will now be described with reference to the flow chart of FIG. 3; the applicability of the name "late output" for this embodiment will become apparent below.

When an input message is transmitted to the recovery unit, it is sent to the primary processing unit I. The primary input block 25 queues the input message in an input queue 30; the ordering of messages in the queue 30 will generally correspond to their order of receipt but it is also possible to give priority to particular messages (for example, messages of a particular type or coming from a particular source). When the primary process 24 is ready to process the next input message, it takes the message appearing at the head of the queue 30 (step 50, FIG. 3).

The primary process 24 then executes the processing appropriate to the input message concerned (step 51); this processing may involve the making of one or more non-deterministic choices. Any application output messages produced by the primary process as a result of it processing the input message are stored in resend queues 32 maintained by the output block 26 (step 52); these application output messages are not, however, output from unit I as the recovery-unit output messages. The output block 26 maintains a respective resend queue 32 for each other recovery unit in the system, the application output messages being stored in the appropriate one of these queues 32.

When the primary process 24 has finished the processing of a particular input message. it passes any changes in its state to state-change buffer block 27 (step 53) and then informs the log block 28 that it has finished processing the input message concerned (as identified by a sequence number associated with the input message). The log block 28 then assembles a log message comprising the sequence number of the input message, any application output messages in queues 32 that were generated in the course of processing that input message, and any state changes to primary process 24 produced during this processing (step 54). The assembled log message is then logged to the unit II.

The log message output by the primary log block 28 is received by the secondary log block 28 (step 55) and the latter passes any state change information in the log message to queue 31 of the secondary state-change buffer block 27, and any output messages in the log message to queues 32 of the secondary output block 26. Each entry in queues 31 and 32 has associated with it the sequence number of the input message giving rise to that entry (this sequence number having been passed in the corresponding log message). If the primary process in processing a particular input message produces multiple application output messages intended for the same destination, then the ordering of these messages is preserved in their copying across between primary and secondary queues 32 by way of the corresponding log message.

The secondary process 24 is operative to progressively update its state by taking entries in FIFO order from the queue 31 (step 56). Upon the secondary process completing its state update in respect of a particular input message, the secondary process informs the secondary input block 25 of the sequence number of this input message to enable the latter to track progress of the secondary process (step 57). At the same time, the secondary process 24 authorises the secondary output block 26 to output as recovery-unit output messages those application output messages, if any, logged from the primary unit I to the secondary output block 26 in respect of the input message concerning which the secondary process has just had its state updated (step 58).

The application output messages held in secondary queues 32 are retained in these queues even after their output as recovery unit output messages.

By arranging for the output block 26 of the secondary unit II to be responsible for the output of the recovery-unit output messages on the basis of application output messages generated by the primary process and logged the secondary unit together with process update information that must be used before the corresponding application output messages are output, it is assured that the world external to the recovery unit can only be aware of the consequences of states of the process 24 that the secondary process has already entered. Should the primary processing unit I fail, the secondary processing unit II can be promoted to the primary processing unit without risk of there being any lost states, that is, externally visible states achieved by the primary but not by the secondary.

The name "late output" given to the present embodiment derives from the fact that each recovery-unit output message is only output from the secondary unit II after the secondary process has had its state updated to reflect the processing that gave rise to the generation of the output message at the primary.

Failfree Operation—"Early Output" Embodiment

In an alternative arrangement herein referred to as "early output", whilst the key characteristic is retained of making the secondary output block 26 responsible for the output of the recovery-unit output messages on the basis of application output messages generated by the primary process and logged the secondary unit together with process update information, the recovery-unit output messages are now output by the secondary output block as soon as they are placed in the queues 32, without waiting for the state of the secondary process to be correspondingly updated. This means that the external world may see output messages corresponding to states not yet entered by the secondary process; however, this does not matter since even if the primary unit I should fail, the secondary unit II already has the state-change information available to it to enable it to be updated to the state corresponding to the recovery-unit output messages previously output by it.

Acknowledgements

As part of its normal operation the recovery unit (whether the late-output or early-output embodiment) sends out acknowledgements ('acks-out') of input messages it has received, and receives back from other recovery units, acknowledgements ('acks-in') of the receipt of recovery-unit output messages sent by the secondary unit II.

The sending of an ack-out in respect of a particular input message is effected in dependence on the receipt at the secondary unit of the log message from the primary unit relevant to that input message. The ack-out will generally be 'piggy-backed' on an output message being sent by the secondary output block 26 to the recovery unit that sent the input message being acknowlegded. However, to cover the possibility of a prolonged absence of an output message to that recovery unit, it is preferably also to implement an alternative transmission mechanism, such as a time-out mechanism by which an ack-out will be sent by itself after, for example, a predetermined time, if no output message to the required recovery unit is generated in that time.

A more conservative acks-out scheme is also possible whereby the sending of an ack-out in respect of a particular input message is delayed until the secondary process has had its state updated to that corresponding to the input message having been processed. This scheme is referred to below as the "conservative acks-out" scheme as opposed to the "standard acks-out" first described above.

As regards acks-in, these may likewise be received 'piggy-backed' on an input message or as separately-sent acknowledgements. In either case, after receipt at the primary processing unit I, acks-in are passed to the secondary processing unit II. At both units, the acks-in are used to effect a garbage-collection operation on the resend queues 32 held by the corresponding output block 26, it no longer being necessary to keep a copy of an output message acknowledged as having been received (such an acknowledgement will only have been sent after the message concerned has been received at the destination primary unit and the latter has logged update information to the related secondary unit).

Failure Behaviour

Having described the operation of the recovery unit in the absence of failures, consideration will now be given to the response of the recovery unit both to a failure of one of its own primary or secondary processing units and to a failure of a processing unit of another recovery unit.

If the secondary processing unit II of the FIG. 2 recovery unit should fail, for whatever reason, then the failover and resend control block 29 of unit I is triggered to take appropriate action. The detection of secondary unit failure may be effected in any known manner, for example by a system unit that monitors a 'heartbeat' from each primary and secondary process; how failure detection is achieved is not material to the present invention and so will not be described further. It will be appreciated that failure of a processing unit I, II may result from a failure internal to the application process 24, from a failure of the supporting software layers 22 and 23, or from a failure of the processor 20 of the unit; in all cases, the processing unit 24 ceases to provide the functionality of process 24 to the recovery unit.

Figure 4:
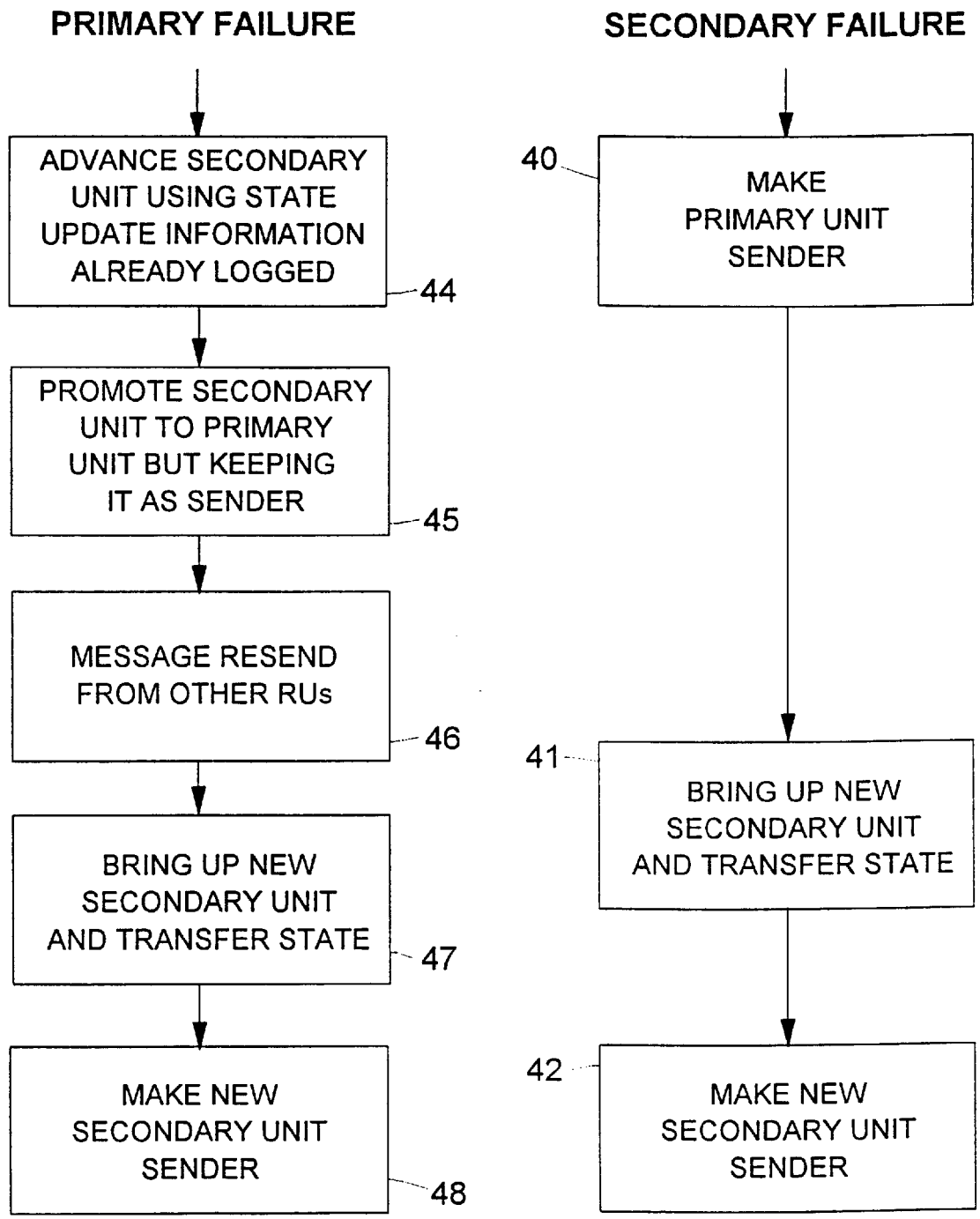
FIG. 4 is a diagram illustrating the main stages occurring during failover of the FIG. 2 recovery unit.

The failover control block 29 of unit I responds to failure of the secondary unit II by bringing about the sequence of actions shown on the right-hand side of FIG. 4. In particular, the application output messages generated by the primary process are now output as the recovery-unit output messages by the primary output block 26 (block 40, FIG. 4). This output is indicated by a dotted line in FIG. 2 as are all failure-related communications in this Figure.

When the primary unit I is made a sender it does not know exactly what output messages the secondary-process unit II has sent prior to its failure. Two alternative arrangements are possible, firstly the primary output block 26 may resend all unacknowledged output messages in its resend queues 32. This may result in a message being sent twice (once from the secondary unit II and again from the primary unit I); however, by numbering the output messages sent to any particular recovery unit in sequential order (one sequence per destination recovery unit from a particular source), each receiving recovery unit can identify and discard duplicate messages. In fact, it is only necessary to explicitly number the first output message sent from a given processing unit to a particular recovery unit since the O/S & comms layer 22 provides a guarantee of ordered, non-repeated, delivery of messages thereby enabling the sequence number of subsequent messages from the same recovery unit to be implied. Alternatively, rather than resending all the unacknowledged output messages, the primary unit I taking responsibility may query the primary units of the remote recovery units to which messages have been sent and resend only those messages which have not been received. The number of such messages will be fewer than the number of unacknowledged messages in its resend queues because messages are acknowledged by remote recovery units only once they are passed to these recovery units secondary units.

It will be appreciated that in order to uniquely identify an output message (and therefore, of course, an input message since the output messages of one recovery unit generally form the input messages of another), it is necessary to know both the sequence number of the message and the identity of the sequence concerned as, for example, identified by the source/destination combination—this latter information will, of course, generally be available as part of the message concerned. In the present specification, the reference to a sequence number of a message should be understood as referring to that sequence number in the context of the sequence concerned.

Upon failure of the secondary unit II, the primary unit I, as well as becoming responsible for the sending of recovery-unit output messages, also becomes responsible for sending acks-out.

A new secondary process is next brought up on an operative processing unit (block 41); persons skilled in the art will be aware of the details of how this may achieved and, accordingly, this step will not be further described herein. The state of the primary process 24 is then transferred to the new secondary process to synchronise the two. Exactly how this state transfer is effected is the responsibility of the primary application process 24 since this process alone will know about what state information is required; the alternative approach of making a memory image copy is not preferred as this results in propagation of uncollected garbage and similar non-useful memory contents).

Finally, the responsibility for sending recovery-unit output messages is passed from the primary processing unit I to the new secondary processing unit (block 42) and the primary unit I commences logging to the new secondary unit.

Considering next what happens upon the failure of the primary processing unit I, this failure is again detected by any suitable mechanism and this time the failover and resend control block 29 of the secondary processing unit II is triggered into action. As illustrated on the left-hand side of FIG. 4, upon primary failure, the failover control block 29 first causes the secondary unit II to advance as far as it can using the contents of the log messages already received to update its state and output recovery-unit output messages (block 44). Thereafter, the unit II takes over the role of the failed primary unit I, the process 24 of unit II now utilising those services offered by the FT layer 23 appropriate to this primary role (block 45), the other recovery units having meanwhile been notified to send messages for the recovery unit to processing unit II rather than to processing unit I. The output block 26 of the newly-promoted primary unit II temporarily remains responsible for sending recovery-unit output messages and acks-out but does not need to resend any output messages.

Because the failed primary processing unit I may have received input messages that had not resulted in a corresponding log message to unit II at the time of failure of unit I, the other recovery units are all prompted to resend any unacknowledged messages they have in their resend queues for the recovery unit that experienced the primary failure (block 46). The request for messages to be resent is generated by the newly-promoted primary processing unit II itself. Because of the sequential message numbering scheme already mentioned above, should a message already taken account of by unit II be resent (for example, because the corresponding ack-out has not yet been transmitted by unit II), the input block 25 of unit II can detect and discard such duplicates.

Next, a new secondary processing unit is brought up and the state of the process 24 of the newly-promoted primary unit II is transferred to the new secondary (block 47). Finally, the responsibility for the sending of recovery-unit output messages and acks-out is transferred to the new secondary processing unit and the primary unit commences sending log messages to the secondary unit (step 48).

In the case of the late-logging embodiment of the FIG. 2 recovery unit, if the secondary unit II practices the above-described conservative ack-out scheme, then the secondary unit II may omit the step of block 44 of FIG. 4 in taking over from a failed primary unit; instead, unit II simply discards any unused entries in its queues 31 and 32 and immediately starts to act as a primary in processing any received input messages. This omission of the rolling forward of the process 24 of unit II is possible because the state of this process 24 is consistent with the externally visible state of the recovery unit (as judged by the recovery-unit output messages), and acks-out have not been sent on messages not yet taken account of in the updating of the state of the process 24 on unit II (so such messages will be retransmitted by their sources).

When a newly created secondary process is brought up, unless the resend queues 32 from the primary output block 26 are transferred (checkpointed) to the secondary output block 26, its resend queues will be empty. Three alternative techniques can be utilised to bring these resend queues up while still sending output messages from the recovery unit.

A first technique comprises sending output messages from both the primary and secondary output blocks until the primary output block no longer contains unacknowledged output messages which were present at the time of hand back of responsibility to the secondary unit. The control block 29 associated with the primary process can detect this condition by having the corresponding output block mark any messages it has in its resend queues at the time of hand back of responsibility; if a resend request is received, it is then a simple matter for the control block 29 to check if any such marked messages still exist. If there are any such messages, then the primary output block 26 resends these messages and the secondary output block 26 resends the messages in its own resend queues. This technique requires that the FT service provided the layer 23 for the support of failover of a different recovery unit has the ability to receive messages from two different resources within the same recovery unit.

A second alternative technique, similar to the first technique, comprises delaying the transfer of responsibility from the primary unit to the secondary unit until the resend queues 32 of the secondary unit are established. The primary unit continues to send output messages, however, no output messages are sent by the secondary unit until its resend queues contain all the messages sent by the recovery unit which remain unacknowledged. At this time the primary unit stops sending output messages and the secondary unit starts sending output messages. There is thus no time at which output messages are being sent by both units. If the primary unit fails before the secondary unit begins to send messages, the recovery unit will fail completely. When employing this technique acknowledgements sent out by the primary unit must be delayed until the secondary unit has handled the message to which the acknowledgement relates so as to prevent the secondary unit from being flooded by more messages than it can process from the primary unit. This is achieved by requiring the secondary unit, during the period it is building up its resend queue and before it assumes responsibility for sending out messages, to send acknowledgements to the primary unit. Once the primary unit receives such an acknowledgement from the secondary unit it sends out an acknowledgement to the remote recovery unit. When the secondary unit assumes responsibility it sends out acknowledgements in the normal manner.

A third technique comprises handing over responsibility to the secondary unit immediately, even though its resend queues may not contain all unacknowledged messages. The secondary unit then queries the primary units of remote recovery units as to which, if any, messages they require. Required messages are requested from the primary unit and relayed to the appropriate remote recovery unit. This technique, although similar to the checkpointing of entire resend queues known in the prior art, involves a far lower overhead since only those messages which are really required by remote recovery units are copied from the primary unit to the secondary unit.

The FT services layer 23 as well as providing FT services for supporting failover of the recovery unit itself following failure of the primary or secondary unit, also provides FT services for supporting failover of other recovery units. The most significant of these services is the resending of unacknowledged output messages sent to a particular recovery unit when requested to do so following a process failure in the latter. The resend queues 32 which have already been described are, of course, an integral part of this service. In normal operation, the output messages will be resent only from the secondary output block 26. On the other hand, if there is as yet no operative secondary processing unit because the recovery unit receiving the resend request is itself recovering from a processing-unit failure and has not yet synchronised its newly created secondary with the primary process, then the primary output block 26 is responsible for the resending of the output messages.

A further capability of the FT layer 23 is the placing in correct order output messages received from the same recovery unit. Whilst the comms layer 22 ensures the ordered delivery of messages from the output block it serves, during failover of a recovery unit, output messages will be sent from two sources, as noted above. As a result, the possibility exists that the output messages sent to another recovery unit may arrive out of order; in particular, the first one or more messages sent from a new secondary processing unit may arrive prior to older messages sent from the primary processing unit. However, because of the aforementioned sequential numbering of messages (explicit or implied), it is possible for the primary input block 25 of a receiving recovery unit to correctly order its input messages before placing them in queue 30. To this end the input block may be provided with an early message queue 33 which it uses to store out of sequence messages pending receipt of the missing messages. Clearly, if either of the alternative techniques described above, which do not result in the sending of messages from two sources are utilised, an early message queue 33 is not required.

Multiple Secondaries

Although in the described embodiments of a recovery unit, only two replicate application processes are run (one by the primary processing entity and the other by the secondary processing entity), it is possible to run more replicate processes to increase the fault tolerance of the recovery unit. Thus, where there are n replicate application processes, in addition to the application process run by the primary processing entity, there will be (n−1) replicate application processes run by respective secondary processing entities with one of these secondary processing entities serving as a sender entity responsible for the output of recovery-unit output messages and acks-out. The sender entity operates in a manner to the secondary processing unit II of FIG. 2; the non-sender secondary entities also operate like unit II with the exception that their output blocks do not send recovery-unit output messages or acks-out.

Two main arrangements are possible in the case of multiple secondary processing entities. Firstly, in a "chained" or "pass-along" arrangement, the primary entity effects its logging to a first one of the secondary entities and the latter is then responsible for logging operations to the next secondary entity, and so on as required for the number of secondary entities present; in this arrangement, the final secondary entity in the logging chain constitutes the sender entity. In the second arrangement, the secondary entities are arranged in a "fan-out" or "one-to-many" configuration relative to the primary entity with the latter sending its logging messages to all secondary entities effectively in parallel; in this case, any one of the secondary entities can be chosen to serve as the sender entity.

Figure 5:
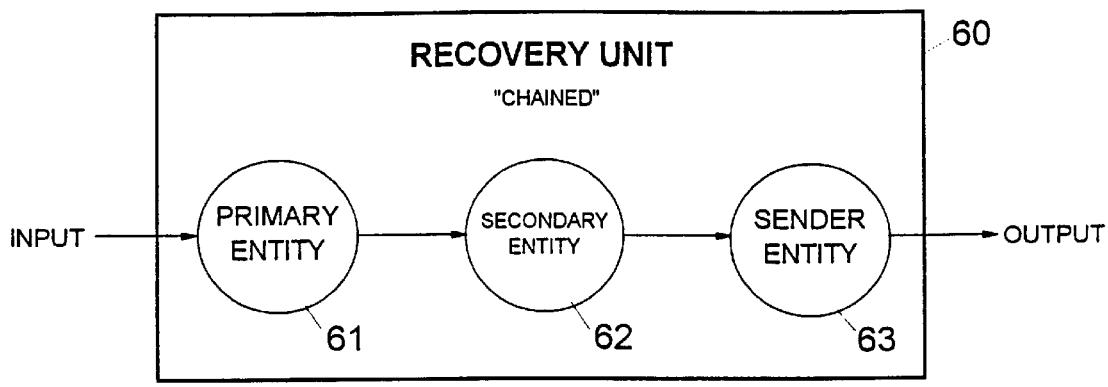
FIG. 5 is a diagram illustrating of chained logging arrangement in a recovery unit with multiple secondaries.

FIG. 5 illustrates a recovery unit 60 with a primary processing entity 61 and a chained arrangement of two secondaries 62, 63. The primary entity 61 sends log messages to the secondary entity 62 which, in turn effects logging to the secondary entity 63, the latter being responsible for the generation and sending of recovery-unit output messages. As regards when logging is effected from the secondary entity 62 to the secondary entity 63, it is possible to adopt either a late-logging or early-logging policy resepctively similar to the late-output and early-output schemes described above for the output of recovery-unit output messages. The early logging scheme obviously has a smaller latency then the late logging scheme and this difference in latency grows with the number of secondary entities present.

If the primary entity 61 fails, then secondary entity 62 takes over as the primary entity in much the same manner as already described above with reference to FIGS. 2 to 4; however, the secondary entity 63 remains responsible for sending recovery-unit output messages. If the secondary sender entity 63 fails, then secondary entity 62 takes over the role of sender, again in a manner similar to that described above for where the primary takes over from a failed secondary of the FIG. 2 recovery unit (though, of course, the entity 62 remains in its secondary role).

If the secondary entity 62 fails (or, more generally, any interior secondary member of a logging chain), then the logging chain must be patched up with the failed entity being by-passed—in the FIG. 5 example, this requires the primary entity to redirect its log messages to the secondary sender entity 63. However, since the possibility exists that the failed interior entity 62 has not passed on to entity 63 all logs received by entity 62 prior to its failure, it is generally necessary for all processing entities other than the last two in the logging chain to maintain a log resend queue of log messages it has sent, the messages in this resend queue being sent to the next-but-one downstream entity in the logging chain should the adjacent downstream entity fail. It is obviously unnecessary for the ultimate entity in the logging chain to maintain a log resend queue as it does not carry out any logging; as regards the penultimate entity, this does not need to maintain a log resend queue since if the entity to which it logs should fail (that is, the final, sender entity) then the penultimate takes over as the sender entity and it not required to effect logging.

The log resend queues must, of course, be managed to remove those log messages it is no longer necessary to resend (because they have been received by at least the next two downstream entities). One possible way of achieving the desired management is by the use of explicit acknowledgements sent to all entities maintaining a log resend queue by the last secondary entity of the logging chain as log messages are received by this latter entity; each entity receiving such a log acknowledgement then deletes the corresponding log message from its log resend queue. A refinement of this approach is to have the last secondary entity of the logging chain only send acknowledgements to the primary entity which then forwards these acknowledgements along the logging chain, preferably piggy-backed to later log messages. It may be noted that with only two secondary entities (as in FIG. 5), the explicit acknowledgement approach reduces to the secondary sender entity 63 sending acknowledgements to the primary entity 61.

An alternative approach to managing the log resend queues is to use implicit acknowledgments. In this case, each log message in a log resend queue has associated with it the sequence number of the output message that is first generated by the primary process following the latter taking for processing the input message which is contained in the log message. Acks-in acknowledging receipt of output messages are delivered to the primary entity by the receivers of these output messages in the usual way. When a processing entity receives such an ack-in, any log message in its log resend queue (where maintained) that has an associated output-message sequence number equal to or less than that to which the ack-in relates can be garbage collected—this is so because the corresponding output message will only have been output from the recovery unit after receipt of the corresponding log message by the sender entity.

The implicit acknowledgement scheme is only efficient if output messages are frequently generated; accordingly, the implicit acknowledgement scheme is preferably operated with a fall back to the sending of explicit acknowledgements if, for example, the size of the log resend queue exceeds a predetermined limit.

Figure 6:
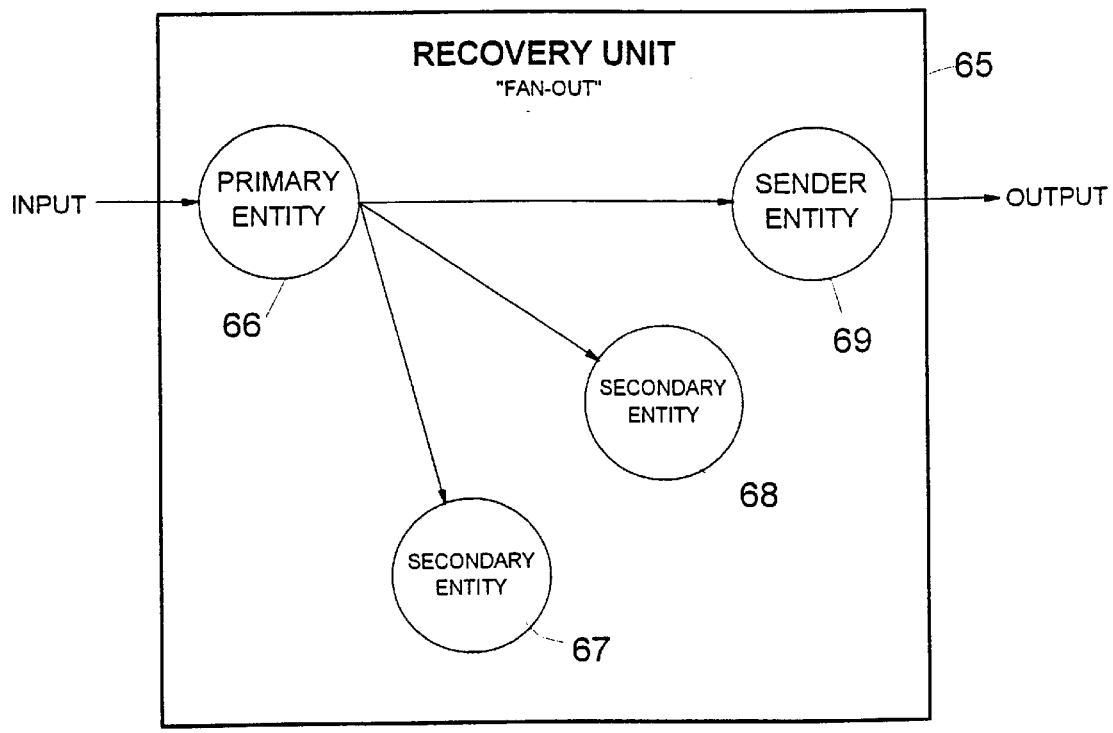
FIG. 6 is a diagram illustrating a fan-out logging arrangement in a recovery unit with multiple secondaries.

FIG. 6 illustrates a recovery unit 65 with a primary processing entity 66 and a fan-out arrangement of three secondaries 67, 68 and 69, the secondary entity 69 serving as the sender entity. The primary entity 61 sends log messages to all secondary entities 67, 68 and 69, this logging being effected according to the early logging or late logging scheme already referred to above.

If the sender entity 69 fails, then one of the other secondary entities 67, 68 is made the sender entity, the secondary entity taking over the sender role generally being predesignated as the standby sender (though this is not essential). Since the new sender entity has been sent all log messages from the primary entity, the state updating of this new sender is uninterrupted and so there is no need to transmit any state information, or retransmit any log messages, from the primary entity to the new sender. However, because the new sender entity may have reached a state in advance of the failed sender entity at the time of failure of the latter, the new sender entity must send any unacknowledged application output messages in its output-message resend queue (for the late-output embodiment, only those messages authorised for output by the secondary process 24 of the entity are output at this time). In fact, it possible to avoid having to resend output messages by arranging for the secondary entity designated as the standby sender, to lag behind the current sender entity so that when the designated standby sender takes over the sender role upon failure of the original sender, this new sender entity will advance from a state behind that achieved by the failed sender entity at its point of failure. The standby sender can be caused to lag behind the original sender entity prior to failure of the latter by arranging for the standby sender to delay it state updating relating to a particular input message until after it has received an indicator from the sender entity that the latter has sent any output messages generated as a result of processing of that input message by the primary entity.

If the primary entity 66 fails, then the most advanced of the secondary entities 67 to 69, is arranged to take over the primary role. Determination of which secondary is most advanced is effected by an exchange of messages between the secondary entities. By having the most advanced secondary become the primary, it is assured that none of the remaining secondaries has already entered a state not achieved by the new primary (such a situation could lead to divergence between the new primary and one or more of the secondaries). However, it is possible that some of the remaining secondaries may not have received all log messages received by the new primary when it was itself a secondary; accordingly, the new primary must resend log messages to the remaining secondaries. To this end, each of the original secondaries is required to keep a log resend queue of log messages it has received. These log resend queues are managed by an explicit acknowledgement scheme that involves each secondary sending an acknowledgement back to the primary upon receipt of a log message; once the primary has received acknowledgements from all secondaries in respect of a particular log message, it sends out a garbage-collect indication in respect of that log message to all the secondaries authorising them to remove that message from their log resend queues. The garbage-collect indications can conveniently be piggybacked on later log messages sent by the primary.

Of course, if the most advanced secondary at the time of failure of the primary is the sender entity, then one of the remaining secondaries must take over the role of the sender in the manner already described; however, this new sender need not effect a resend of any output messages since this new sender will not, by definition, be in a more advanced state than the old sender that has been promoted to become the primary entity.

Rather than having the most advanced secondary take over the primary role upon failure of the original primary, it is alternatively possible to have a predesignated one of the secondaries (such as the sender) take over as the new primary. However, in this case since the new primary may lag behind one or more of the remaining secondaries, the new primary must be rolled forward to the state of the most advanced of the remaining secondaries. To this end, the new primary tells the remaining secondaries of the latest log message it has received and these secondaries then send to the primary any later log messages they have in their log resend queues (these queues are maintained in the manner already descibed above). The primary then uses these log messages to roll forward (this involves the new primary temporarily continuing to act as a secondary); at the same time, the new primary outputs to all secondaries both any log messages in its log resend queue and the new log messages passed to it thereby to ensure that all the secondaries have received all log messages (of course, if a secondary has already received a log message, it will discard any new copy sent to it).

Variants

Many variants are, of course, possible to the described embodiments of the invention.

Thus, it would be possible to arrange for the primary processing entity to update the secondary entities by passing them, not state change information as such, but the input messages received by the primary entity together with any non-deterministic choices made by the primary process 24 in processing each input message. The or each secondary process would then update its state by actually processing the input messages, using the logged non-deterministic choices whenever such a choice was required in the course of such processing. The secondary output block would still receive application output messages logged from the primary entity and use these messages as the recovery-unit output messages rather than the application output messages produced by the sender process 24 in the course of its processing. Our co-pending European Patent Application describes embodiments of a recovery unit that also has a primary entity which logs input messages and non-deterministic choices to the or each secondary entity; however, in the embodiments of our co-pending application, the application output messages produced by the secondary process of the sender entity are actually used as the recovery-unit output messages, it therefore being unnecessary for the primary entity to log its application output messages to the or each secondary entity.

Generally as regards the primary and secondary processing entities, although the primary and secondary entities are shown in FIG. 2 as separate units with their own respective processors 20, it would be possible to overlap the primary and secondary processing entities by having a common processor 20 and O/S and comms layer 22 upon which the replicate primary and secondary application processes are run. In this case, a single, common, FT services layer 23 could be provided for both replicates or else a respective FT layer could be provided for each (where the FT services are included as linked libraries with the application processes 24 themselves, then, only the latter possibility exists). Running both primary and secondary replicates on the same processor 20 does, of course, limit the type of failure protected against to those parts that are replicates, namely the actual application process itself and, where separately provided for each replicate, the FT services software.

Furthermore, several different application processes may be run above the software layers 22 and 23 on the same processor 20. In this case, the distribution between processors 20 of the primary and secondary replicates of an application may differ from application process to application process. Thus, a processor 20 with its software layers 22 and 23 may form together with a replicate application process of a first application a primary processing entity in respect of that first application, whilst at the same time forming together with a replicate process of a second application, a secondary processing entity in respect of that second application.

It is worthy of note that the FT services layer 23 can be used with non-replicated processes to integrate these processes into an overall system including the described recovery unit. These non-replicated processes are generally not critical to a system but need to behave in a manner consistent with the operation of the recovery units that have replicated application processes. To this end, each non-replicated process interacts with a FT services layer in the same manner as a replicated process but now the FT services layer is set to operate as for a primary processing unit in the case where there are no secondary units (so that the primary unit is responsible for sending output messages and ack-outs). Services such as output message resends are thereby made available to the non-replicated process. Of course, the non-replicated process need not be capable of transferring state information to a secondary as is required for process 24.

It is also worthy of note that the described recovery unit operates in a pipe-lined manner, the primary processing entity of the recovery unit being capable of starting the processing of a new input message prior to the sender processing entity outputting any output message produced by the processing of the previous input message.

I claim:

1. A method of operating a fault-tolerant recovery unit for receiving and processing input messages to produce output messages, the method comprising the steps of:

(a) providing at least two processing entities running respective replicate application processes capable of processing said input messages to progress through a succession of states and produce application messages, one said processing entity serving as a primary processing entity and each other said processing entity serving as a secondary processing entity with one said secondary processing entity acting as a sender processing entity;

(b) receiving said input messages at said primary processing entity and causing said replicate application process run by the latter, herein the primary process, to process these input messages to produce application messages;

(c) logging to each said secondary processing entity said application messages produced by the primary process together with update information for enabling the replicate application process run by each secondary processing entity, herein a secondary process, to update its state to track the state of the primary process;

(d) causing each secondary process to use said update information logged to the secondary processing entity running the secondary process, in order to track the state of the primary process; and (e) outputting from said sender processing entity as said recovery-unit recovery messages, the application messages logged to the sender entity from the primary processing entity in step (c), the application messages so output being restricted to those produced by the primary process during processing for which update information has been received by said sender processing entity;

said method comprising the further steps of:

(f) upon failure of the primary processing entity, causing a said secondary processing entity to take over the role of the primary processing entity, and (g) upon failure of the sender processing entity or upon the sender processing entity taking over the role of the primary processing entity in step (f), causing another of said secondary processing entities, where present, to become the sender processing entity, and otherwise, causing the primary processing entity to output the application messages produced thereby as said output messages, this step (g) being effected without loss of recovery-unit output messages.

2. A method according to claim 1, wherein said update information comprises the changes in state experienced by the primary process in processing each input message, each secondary process directly using this state-change information to update its own state in step (d).

3. A method according to claim 1, wherein said update information comprises said input messages together with any non-deterministic choices made by the primary process in processing these input messages, each secondary process updating, its state in step (d) by processing said input messages but instead of itself making any non-deterministic choices required by this processing, using the choices logged to it as part of said update information.

4. A method according to claim 1, wherein each said application message output in step (e) is only output after the state of the secondary process of the sender processing entity has been updated to take account of the processing effected by the primary process in producing that application message.

5. A method according to claim 1, wherein each said application message output in step (e) is output following receipt by the sender entity of the update information necessary to update the state of the secondary process of the sender entity to take account of the processing effected by the primary process in producing that application message, but without waiting for such updating to be effected.

6. A method according to claim 1, wherein at least two said secondary processing entities are provided, step (c) being effected in a pass-along manner with the primary processing entity effecting said logging to one said secondary processing entity and this entity in turn effecting logging to another said secondary processing entity and so on as required, the said sender processing entity being the final entity in this logging chain.

7. A method according to claim 6, including the steps of:
maintaining at least one resend queue of items logged in step (c), and
upon failure of an intermediate said secondary processing entity in said logging chain, resending at least certain of said items from said resend queue to the secondary processing entity following the failed said secondary processing entity in the logging chain.

8. A method according to claim 7, wherein a respective said resend queue is maintained by at least each said processing entity other than the last two in said logging chain, the items in each such queue being those sent out by the corresponding processing entity.

9. A method according to claim 7, including causing the last said processing entity in said logging chain to output an indicator upon receipt of a said item logged to it, and using said indicator to initiate removal of said item from the or each said resend queue.

10. A method according to claim 1, wherein at least two said secondary processing entities are provided, step (c) being effected in a one-to-many manner with the primary processing entity effecting said logging to all said secondary processing entities.

11. A method according to claim 10, including the further steps of:
maintaining for each secondary processing entity a resend queue of items logged to that entity in step (c), and
upon a said secondary processing entity being promoted in step (f) to become the primary processing entity, using said resend queues to ensure that all remaining processing entities have received the same logged items whereby to enable such entities to be advanced to the same states.

12. A method according to claim 11, wherein step (f) involves determining which of said secondary processing entities has its application process most advanced, promoting that processing entity to be the primary processing entity, and sending to the remaining secondary processing entities at least certain items from the said resend queue of the new primary processing entity.

13. A method according to claim 11, wherein step (f) involves forwarding to the new primary processing entity from said resend queues of the remaining secondary processing entities, any said items that are present in the latter queues but not in the resend queue of the new primary processing entity, and using these forwarded items to advance the primary processing entity.

14. A method according to claim 10, including causing each secondary processing entity to output an indication upon receipt of a said item logged to it, and initiating removal of said item from said resend queues when all said secondary processing entities have produced a said indication in respect of a particular said item.

15. A method according to claim 1, wherein only one said secondary processing entity is provided.

16. A method according to claim 1, comprising the additional step, following failure of a said processing entity, of bringing up a new secondary processing entity running a new said secondary process and transferring to this new secondary process state information on a said replicate application process running on a non-failed said processing entity of the recovery unit.

17. A method according to claim 16, wherein only one said secondary processing entity is normally provided, said additional step further comprising, upon the state-information transfer being complete, of causing the new secondary processing entity to serve as said sender processing entity.

18. A method according to claim 1, wherein said input messages contain information as to their source and, at least implicitly, their sequencing, and wherein step (b) further involves temporarily storing input messages received out of sequence from said source while awaiting receipt of missing earlier-in-sequence messages, and submitting the input messages received from said source for processing by said primary process in their correct sequencing.

19. A method according to claim 1, including the further steps of:
logging in a resend queueing arrangement the said application messages available at that one of said processing entities which according to step (g) is to output application messages as said output messages in the event of failure of the sender processing entity; and
resending from said resend queueing arrangment at least some of the application messages held therein upon failure of the sender processing entity.

20. A method according to claim 1, including the further steps of:
logging in a resend queueing arrangement the said application messages logged to the sender processing entity; and
resending from said resend queueing arrangment at least some of those output messages destined for a particular further said recovery unit on failover of the latter.

21. A method according to claim 1, including the further steps of:
logging in a respective resend queueing arrangement the said application messages generated by each said replicate application process;
following failure of a said processing entity:
bringing up a new secondary processing entity running a new said secondary process,
providing said new secondary process with an associated said resend queueing arrangement, and
transferring to said new secondary process state information, but not logged application messages, associated with a said replicate application process running on a non-failed said processing entity of the recovery unit; and
upon failover of a particular further said recovery unit, resending from said resend queueing arrangement associated with the secondary process run by the sender processing entity, at least some of the messages logged therein that are addressed to said particular further said recovery unit;
this latter step involving, when said sender processing entity is formed by said new secondary processing entity, causing said non-failed processing entity to send to said particular further recovery unit application messages in its resend queueing arrangement that are addressed to said particular further recovery unit and are associated with states of said non-failed processing entity entered prior to the said transferring of state information to said new secondary processing entity.

22. A method according to claim 19, including the further step of receiving input acknowledgements acknowledging the receipt of said output messages, and removing from said resend queue those output messages the receipt of which has been acknowledged.

23. A method according to claim 1, including the further step of outputting from the sender processing entity an acknowledgement of each said input message received by the primary processing entity, said acknowledgement being output following receipt by the sender processing entity of said update information that takes account of the processing effected by the primary process in processing the input message concerned.

24. A method according to claim 1, wherein each said processing entity comprises a respective processor running the corresponding said replicate application process.

25. A method according to claim 1, wherein said processing entities share a common processor on which said replicate application processes are run.

26. A method according to claim 1, comprising the additional steps, following failure of a secondary processing entity, of bringing up a new secondary processing entity running a new said secondary process, transferring to said new secondary processing entity responsibility for sending output messages, and causing said new secondary processing entity to request from said primary processing entity only those output messages required by other said recovery units.

* * * * *